April 19, 1927.
A. BLACK
1,625,700
FREIGHT AIRPLANE BODY
Filed June 1, 1925
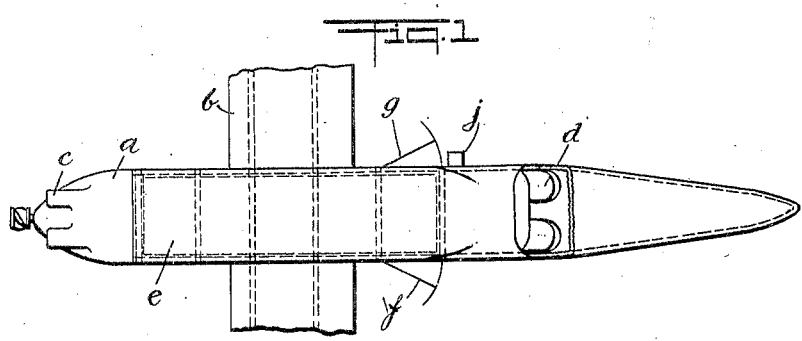
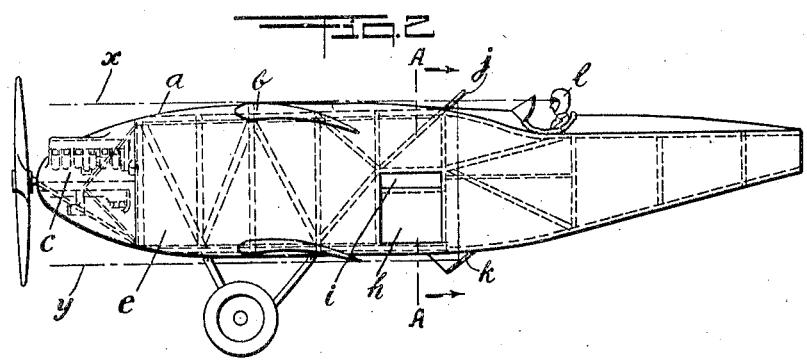
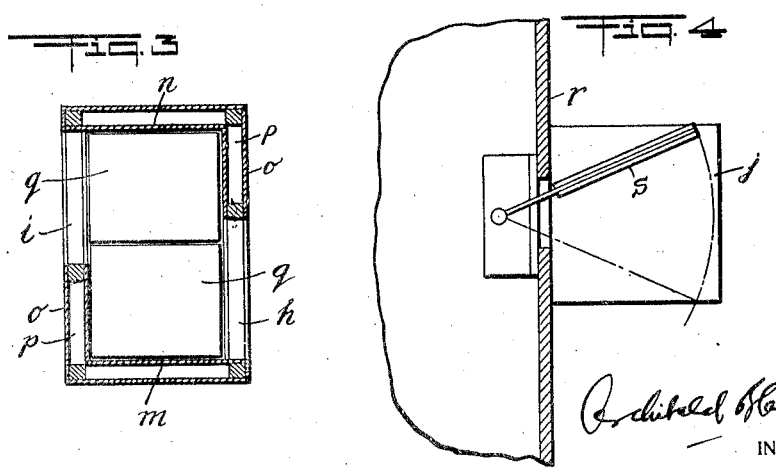
INVENTOR Patented Apr. 19, 1927.

1,625,700

UNITED STATES PATENT OFFICE.

ARCHIBALD BLACK, OF GARDEN CITY, NEW YORK.

FREIGHT-AIRPLANE BODY.

Application filed June 1, 1925. Serial No. 34,260.

My invention relates to airplane bodies and particularly to those used for the transportation of freight, packages, letters and similar matter. It will be obvious, however, that certain features of this invention may also be applied to advantage in the construction of airplane bodies intended for other purposes without departing from the basic principles of the invention.

This invention provides a type of airplane body which permits more convenient entry and exit; which allows the use of more efficient methods of handling cargo and which provides a safer location for the pilot while, at the same time, providing satisfactory range of vision.

In the transportation of packages by railroad, motor truck and other means, it has been found advantageous to make use of standardized containers designed to fit closely into a compartment in the vehicle. The use of such containers eliminates the necessity for handling many loose packages of different sizes and, as each container can be locked, individual packages cannot become lost or stolen. This method of handling shipments is of even greater value in transportation by airplane because, in addition to its other advantages, it permits convenient distribution of weight in the cargo compartment. Furthermore, any vacant space in the cargo compartment of the airplane may be filled with empty containers, thus the cargo may be prevented from moving during flight even when the compartment is not fully loaded. This method however, cannot be used with conventional airplane bodies as the cargo compartment is not adapted to accommodate the containers and as structural considerations restrict the size of the openings in the walls to an extent which precludes convenient accessibility to certain parts of the cargo space. My invention provides an airplane body which is free from these limitations, which has a cargo compartment adapted to allow the use of the system described and which also provides a safer position for the pilot by the location of his seat behind the cargo compartment. To prevent this rear position of the pilot from interfering with his forward vision, I provide a system of mirrors by which he is enabled to look around such portions of the airplane as may interfere with his direct vision. Furthermore, I provide means for removing moisture or fog which may collect upon the surface of the mirrors.

In the accompanying drawings Fig. 1, is a plan view of an airplane body embodying my invention, while Fig. 2, is a view of the left side of the same body. Fig. 3, is a cross section through this body, on the line A—A of Fig. 2, looking rearward and illustrating the arrangement of the doors and the method of placing standardized containers in my type of body. Fig. 4, shows one of my reflecting mirrors, as viewed from a point in a line perpendicular to the plane of the mirror, drawn to an enlarged scale.

In Figs. 1, and 2, the body $a$, is carried by wings $b$, only parts of which are shown, and is provided with engine $c$, pilot's seat $d$, and cargo compartment $e$. Compartment $e$, is provided with two doors $f$, and $g$, located on opposite sides of body $a$, and so placed, at different heights, as to allow access for the full height of the compartment, such access being obtained partly by the use of one door and partly by the use of the other. By this arrangement of doors the full height of the cargo compartment is made accessible while, at the same time, a substantial portion of the side of the body remains continuous so that the structure is not dangerously weakened by the door openings $h$, and $i$. Mirrors $j$, and $k$, are provided to enable the pilot $l$, to see forward where his range of vision would otherwise be obstructed by the forward part of body $a$. Broken line $x$, indicates a line of direct vision while broken line $y$, indicates a line of reflected vision. Mirrors $j$, and $k$, may be so placed that $x$, and $y$, intersect at some point in front of body $a$, if desired.

In Fig. 3, $h$, and $i$, are openings for doors $f$, and $g$, respectively, the lower part of compartment $e$, being accessible through opening $h$, while the upper part is accessible through opening $i$, thus making compartment $e$, accessible from floor $m$, to roof $n$, while, at the same time, ample space is retained in walls $o$, for structural members $p$. Standardized containers $q$, are so proportioned that they may be passed through openings $h$, and $i$, and placed in rows, vertically and horizontally, until the whole compartment $e$, is filled.

In Fig. 4, reflecting mirror $j$, is supported by the body or other member $r$, in such relation to other mirror or mirrors $k$, that a forward view is provided as hereinbefore described. Mirrors *j*, and *k*, are provided with wiping device *s*, similar to a conventional automobile windshield wiper and either manually or automatically operated, for wiping the surface thereof.

Having thus described my invention, I claim as new and desire to secure by Letters Patent:

1. An airplane body having a cargo compartment comprising substantially flat side walls, and substantially flat top and bottom walls, forming a symmetrical internal cargo space, standardized cargo containers of dimensions corresponding to the said cargo space and openings in the side walls to permit removal of the said containers.

2. An airplane body having a cargo compartment comprising substantially flat side walls, and substantially flat top and bottom walls, forming a symmetrical internal cargo space, standardized cargo containers of dimensions corresponding to the said cargo space and openings in the side walls to permit removal of the said containers, a pilot's seat behind the said cargo space, and means for permitting unobstructed vision from the said seat.

3. An airplane body having a cargo compartment comprising substantially flat side walls, and substantially flat top and bottom walls, forming a symmetrical internal cargo space, standardized cargo containers of dimensions corresponding to the said cargo space and doors in the said side walls for permitting access to the cargo space from the top to the bottom thereof.

4. An airplane body having a cargo compartment comprising substantially flat side walls, and substantially flat top and bottom walls, forming a symmetrical, internal, cargo space for standardized cargo containers, openings in both sides of the body, structural means embodied in the side wall and extending over the opening at one side of the body, structural means embodied in the side wall and extending beneath the opening at the opposite side of the body.

5. An airplane body having a cargo compartment comprising substantially flat side walls, and substantially flat top and bottom walls, forming a symmetrical, internal, cargo space for standardized cargo containers, openings in both sides of the body, structural means embodied in the side walls and extending over the opening at one side of the body, structural means embodied in the side wall and extending beneath the opening at the opposite side of the body, and a door for each of said openings.

6. An airplane body having a cargo compartment comprising substantially flat side walls, and substantially flat top and bottom walls, forming a cargo space having opposed wall faces parallel to each other, structural means extending from end to end of the side walls of the cargo space, and side openings arranged in staggered relation to each other and above and below the said structural means.

7. An airplane of the character described, comprising a load carrying compartment, pilot's accommodation located behind the said compartment, and means for providing unobstructed vision in a forward direction beneath the said compartment as well as above the same.

8. An airplane of the character described, comprising a load carrying compartment, pilot's accommodation located behind the said compartment, means for providing unobstructed vision in a forward direction beneath the said compartment as well as above the same and devices for the removal of moisture from such means.

In testimony whereof, I have signed my name to this specification this 30th day of May 1925.

ARCHIBALD BLACK.